US012695653B2

(12) United States Patent
Fukuzono et al.

(10) Patent No.: US 12,695,653 B2
(45) Date of Patent: Jul. 28, 2026

(54) WIRELESS COMMUNICATION METHOD, TRANSMITTER, RECEIVER, AND WIRELESS COMMUNICATION SYSTEM

(71) Applicant: NTT, Inc., Tokyo (JP)

(72) Inventors: Hayato Fukuzono, Musashino (JP); Keita Kuriyama, Musashino (JP); Masafumi Yoshioka, Musashino (JP); Toshifumi Miyagi, Musashino (JP); Takeshi Onizawa, Musashino (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/848,578

(22) PCT Filed: Mar. 29, 2022

(86) PCT No.: PCT/JP2022/015688
§ 371 (c)(1),
(2) Date: Sep. 19, 2024

(87) PCT Pub. No.: WO2023/188037
PCT Pub. Date: Oct. 5, 2023

(65) Prior Publication Data
US 2025/0211471 A1     Jun. 26, 2025

(51) Int. Cl.
*H04L 1/02*          (2006.01)
*H04B 1/02*          (2006.01)
*H04L 27/26*         (2006.01)
*H04W 72/044*        (2023.01)

(52) U.S. Cl.
CPC ........... *H04L 27/2601* (2013.01); *H04B 1/02* (2013.01); *H04W 72/044* (2013.01)

(58) Field of Classification Search
CPC ....... H04L 27/2601; H04L 27/32; H04B 1/02; H04B 1/30; H04W 72/44; H04W 72/044
USPC ................................. 375/267, 232, 260, 299
See application file for complete search history.

(56) References Cited

U.S. PATENT DOCUMENTS

2017/0257250 A1* 9/2017 He ........................ H04B 7/0413
2019/0036749 A1* 1/2019 Erez .................... H04L 27/2646

OTHER PUBLICATIONS

Tim Schenk, "RF imperfections in High-rate Wireless Systems Impact and Digital Compensation", Springer, 2008, pp. 139-145.
(Continued)

*Primary Examiner* — Khai Tran
(74) *Attorney, Agent, or Firm* — XSENSUS LLP

(57) ABSTRACT

A radio communication method according to an embodiment is a radio communication method for transmitting a signal from a transmitter to a receiver using a single carrier, in which the transmitter generates two or more training signals using a symmetric subcarrier at the time of training to perform an OFDM modulation, and shapes a spectrum of each of the OFDM-modulated training signals to be close to a single carrier spectrum, and in which the receiver adjusts the timing of two or more training signals, using a single carrier time domain correlation sequence at the time of training, estimates a channel response and an IQ imbalance from the two or more training signals whose timing is adjusted, compensates for the estimated IQ imbalance, and demodulates the compensated signal.

10 Claims, 5 Drawing Sheets

(56)  References Cited

OTHER PUBLICATIONS

Egashira et al., "A Novel IQ Imbalance Compensation Method with Pilot-Signals for OFDM System", Institute of Electronics, Information and Communication Engineers journal, B vol. J91-B No. 5, 2008, pp. 558-565 (16 pages including English Translation).

"Part 11: Wireless LAN Medium Access Control (MAC) and Physical Layer (PHY) Specifications", IEEE Std 802.11ad™-2012, IEEE Computer Society, Oct. 19, 2012, pp. 1-598.

Zhang et al., "Iterative IQ Imbalance Compensation Receiver for Single Carrier Transmission", IEEE Transactions on Vehicular Technology, vol. 66, No. 9, Sep. 2017, pp. 8238-8248.

Mohammadian Amirhossein et al: "RF Impairments in Wireless Transceivers: Phase Noise, CFO, and IQ Imbalance—A Survey", IEEE Access, IEEE, USA, vol. 9, Aug. 2, 2021 (Aug. 2, 2021), pp. 111718-111791, XP011871938, DOI: 10.1109/ACCESS.2021. 3101845 [retrieved on Aug. 12, 2021].

* cited by examiner

Fig. 5

| | REFERENCE (TRAINING) SIGNAL |
|---|---|
| DETECT PACKET | STF |
| CORRECT CFO | STF |
| TIMING SYNCHRONIZATION | STF |
| ESTIMATION OF CFR AND IQI | CEF |
| NOISE ESTIMATION | STF |
| FDE(~MMSE) | — |
| PHASE TRACKING | GI (CP) OF DATA FIELD |

WIRELESS COMMUNICATION METHOD, TRANSMITTER, RECEIVER, AND WIRELESS COMMUNICATION SYSTEM

CROSS-REFERENCE TO RELATED APPLICATION

The present application is based on PCT filing PCT/JP2022/015688, filed Mar. 29, 2022, the entire contents of which are incorporated herein by reference.

TECHNICAL FIELD

The present invention relates to a radio communication method, a transmitter, a receiver, and a radio communication system.

BACKGROUND ART

In a single carrier transmission using orthogonal modulation and demodulation, orthogonal components I and Q to be received may become signals of different attenuation and phase rotation under the influence of different interference (IQ imbalance).

In a subcarrier transmission such as orthogonal frequency division multiplexing (OFDM), when the IQ imbalance occurs, a channel response value and an IQ imbalance value can be simultaneously estimated, using two or more pilot signals, and the IQ imbalance can be compensated for (see, for example, NPL 1).

For example, in the OFDM, since symmetric subcarriers (indices k and −k) leak from each other, the IQ imbalance can be estimated using the symmetric subcarriers of two or more training OFDM symbols (see, for example, NPL 2).

CITATION LIST

Non Patent Literature

[NPL 1] T. Schenk, "RF Imperfections in High-rate Wireless Systems Impact and Digital Compensation", Springer, 2008, pp. 139-145
[NPL 2] Keima Egashira, 2 others, "A Novel IQ Imbalance Compensation Method with Pilot-Signals for OFDM System", Institute of Electronics, Information and Communication Engineers journal, B Vol. J91-B No. 5, 2008, pp. 558-565.
[NPL 3] Part11: Wireless LAN Medium Access Control (MAC) and Physical Layer (PHY) Specifications, Amendment 3: Enhancements for Very High Throughput in the 60 GHz Band, IEEE Computer Society, IEEE Std. 802.11adTM-2012.

SUMMARY OF INVENTION

Technical Problem

However, in the related art, in the single carrier transmission under a frequency selective fading communication path, since there is no symmetric subcarrier, training arrangement for the symmetric subcarrier cannot be performed, and quality deterioration due to IQ imbalance cannot be prevented.

The present invention has been achieved in view of the above-mentioned problem, and an object thereof is to provide a radio communication method, a transmitter, a receiver and a radio communication system capable of estimating and compensating for IQ imbalance even when performing the single carrier transmission.

Solution to Problem

A radio communication method according to an embodiment of the present invention is a radio communication method for transmitting a signal from a transmitter to a receiver using a single carrier, in which the transmitter generates two or more training signals using a symmetric subcarrier at the time of training to perform an OFDM modulation, and shapes a spectrum of each of the OFDM-modulated training signals to be close to a single carrier spectrum, and in which the receiver adjusts the timing of two or more training signals, using a single carrier time domain correlation sequence at the time of training, estimates a channel response and an IQ imbalance from the two or more training signals whose timing is adjusted, compensates for the estimated IQ imbalance, and demodulates the compensated signal.

A transmitter according to an embodiment of the present invention is a transmitter which transmits a signal to a receiver using a single carrier, the transmitter includes an OFDM modulation unit which generates two or more training signals using a symmetric subcarrier at the time of training and performs an OFDM modulation; and a shaping unit which shapes a spectrum of each of the training signals OFDM-modulated by the OFDM modulation unit to be close to a single carrier spectrum.

A receiver according to an embodiment of the present invention is a receiver which receives a signal from a transmitter using a single carrier, the receiver includes a timing adjusting unit which adjusts timing of two or more training signals using a single carrier time domain correlation sequence at the time of training; an estimating unit which estimates a channel response and an IQ imbalance from the two or more training signals whose timing is adjusted by the timing adjusting unit; a compensating unit which compensates for the IQ imbalance estimated by the estimating unit; and a demodulating unit which demodulates a signal compensated by the compensating unit.

A radio communication system according to an embodiment of the present invention is a radio communication system which transmits a signal from a transmitter to a receiver using a single carrier, in which the transmitter includes an OFDM modulating unit which generates two or more training signals using a symmetric subcarrier at the time of training to perform an OFDM modulation, and a shaping unit which shapes a spectrum of each of the training signals OFDM-modulated by the OFDM modulating unit to be close to a single carrier spectrum, and in which the receiver includes a timing adjusting unit which adjusts timing of two or more training signals, using a single carrier time domain correlation sequence at the time of training, an estimating unit which estimates a channel response and an IQ imbalance from two or more training signals whose timing is adjusted by the timing adjusting unit, a compensating unit which compensates for the IQ imbalance estimated by the estimating unit, and a demodulating unit which demodulates the signal compensated by the compensating unit.

Advantageous Effects of Invention

According to the present invention, it is possible to estimate and compensate for the IQ imbalance even when the single carrier transmission is performed.

BRIEF DESCRIPTION OF DRAWINGS

FIG. 5 is a diagram showing signals referenced when each function of the receiver shown in FIG. 4 processes each packet.

DESCRIPTION OF EMBODIMENTS

Figure 1:
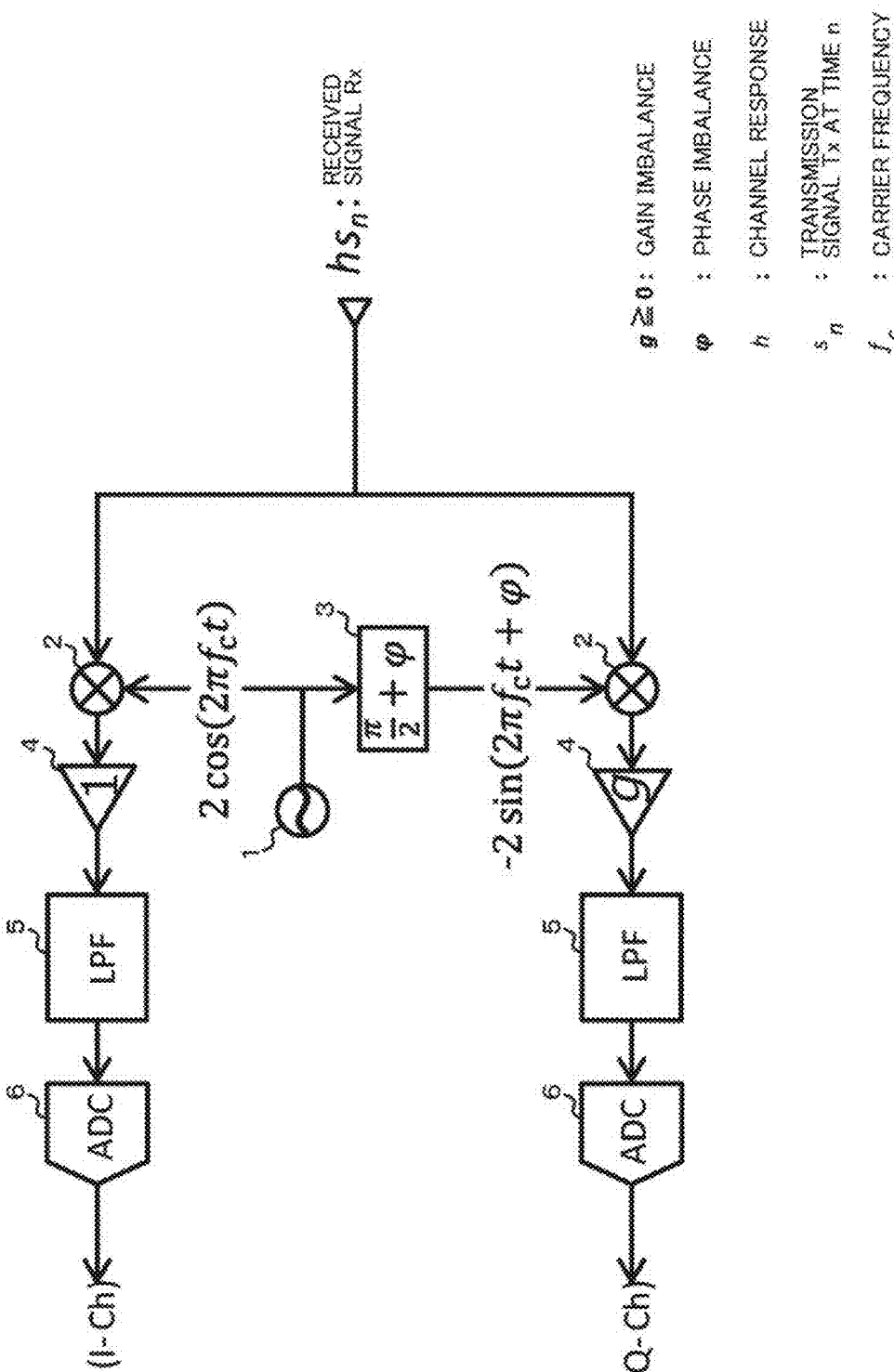
FIG. 1 is a diagram showing the functionality of a receiver that enables estimation of IQ imbalance using a training signal.

First, the background leading to the present invention will be described. FIG. 1 is a diagram showing the function of a receiver which that enables estimation of IQ imbalance using a training signal.

In the receiver shown in FIG. 1, a signal having a frequency generated by an oscillation circuit 1 is mixed with a received signal Rx by two mixers 2 and received.

The received signal Rx distorted by the imbalance of IQ is represented by the following equation (1).

[Math. 1]

$$y_n = Re(hs_n) + j \cdot Im(ge^{-j\varphi}hs_n) \qquad (1)$$

$$= \frac{(1 + ge^{-j\varphi})hs_n + (1 - ge^{j\varphi})h^*s_n^*}{2}$$

Further, $S_n=1$ (1st pilot) of the transmission signal Tx at time n is represented by the following equation (2).

[Math. 2]

$$y_n = \frac{(1 + ge^{-j\varphi})h + (1 - ge^{j\varphi})h^*}{2} \qquad (2)$$

$S_n=J$ (2nd pilot) of the transmission signal Tx at time n is represented by the following equation (3).

[Math. 3]

$$-jy_n = \frac{(1 + ge^{-j\varphi})h - (1 - ge^{j\varphi})h^*}{2} \qquad (3)$$

Here, the following equations (4) and (5) are assumed to be A and B.

[Math. 4]

$$A = y_n - jy_n = (1 + ge^{-j\varphi})h \qquad (4)$$

[Math. 5]

$$B = (y_n + jy_n)^* = ((1 - ge^{j\varphi})h^*)^* = (1 - ge^{-j\varphi})h \qquad (5)$$

At this time, the estimation result of the channel response, the estimation result of the gain imbalance, and the estimation result of the phase imbalance are expressed by the following equation (6), (7), and (8).

[Math. 6]

$$\frac{A + B}{2} = \hat{h} \qquad (6)$$

[Math. 7]

$$\left| \frac{A - B}{2\hat{h}} \right| = \hat{g} \qquad (7)$$

[Math. 8]

$$-angle\left( \frac{A - B}{2\hat{g}\hat{h}} \right) = \hat{\varphi} \qquad (8)$$

A phase compensation unit 3 for compensating for the phase imbalance of the symmetric subcarriers is provided in the preceding stage of one mixer 2.

The amplifier 4, which amplifies the signal whose phase imbalance is compensated, among the two amplifiers 4, compensates for the gain imbalance.

Then, it is possible to output the signal of I-Ch obtained by AD-converting the ADC 6 via a LPF 5, and the signal of Q-Ch obtained by AD-converting the ADC 6 via the LPF 5 by compensating for the phase imbalance and the gain imbalance.

At this time, the channel response at the compensated time n is represented by the following equation (9).

[Math. 9]

$$(\text{Compensation } hs_n) = \frac{(1 + \hat{g}e^{j\hat{\varphi}})y_n - (1 - \hat{g}e^{j\hat{\varphi}})y_n^*}{\hat{g}e^{j\hat{\varphi}} + \hat{g}e^{-j\hat{\varphi}}} \qquad (9)$$

In this way, the IQ imbalance caused by an imbalance between the quadrature modulation and the demodulator can be estimated from two or more training (pilot) signals simultaneously with the channel response (channel response) h, and can be compensated (see NPL 1).

When the IQ imbalance is estimated in the OFDM transmission, for example, it is possible to use signals of the following equation (10) in a subcarrier k of the received signal Rx in a frequency domain and the following equation (11) in the symmetric subcarrier-k.

[Math. 10]

$$\text{Mirror carrier leak } 2Y_k = \overset{=2}{(1 + ge^{j\varphi})}H_k S_k + \overset{=0}{(1 - ge^{j\varphi})}H_{-k}^* S_{-k}^* \qquad (10)$$

[Math. 11]

$$2Y_{-k}^* = (1 - ge^{-j\varphi})H_k S_k + (1 + ge^{j\varphi})H_{-k}^* S_{-k}^* \qquad (11)$$

- $H_k$: CFR of subcarrier $K$

- $S_k$: Tx signal of frequency domain

- $g \geqq 0$: Gain imbalance (frequency independent)

- $\varphi$: Phase imbalance (frequency independent)

The transmission signal $S_k=S_{-k}=1$ in the frequency domain in the first training (1st training) OFDM symbol is represented by the following equations (12) and (13), respectively.

[Math. 12]

$$2Y'_k = \left(1 + ge^{-j\varphi}\right)H_k + \left(1 - ge^{j\varphi}\right)H^*_{-k} \tag{12}$$

[Math. 13]

$$2Y'^*_{-k} = \left(1 - ge^{-j\varphi}\right)H_k + \left(1 + ge^{j\varphi}\right)H^*_{-k} \tag{13}$$

At this time, the following equations (14) and (15) are assumed to be A and B.

[Math. 14]

$$A = Y'_k + Y'^*_{-k} = H_k + H^*_{-k} \tag{14}$$

[Math. 15]

$$B = Y'_k - Y'^*_{-k} = ge^{-j\varphi}H_k - ge^{j\varphi}H^*_{-k} \tag{15}$$

The transmission signal $S_k = S_{-k} = -1$ in the frequency domain in the second training (2nd Training) OFDM symbol is represented by the following equations (16) and (17), respectively.

[Math. 16]

$$2Y''_k = \left(1 + ge^{-j\varphi}\right)H_k - \left(1 - ge^{j\varphi}\right)H^*_{-k} \tag{16}$$

[Math. 17]

$$2Y''^*_{-k} = \left(1 - ge^{-j\varphi}\right)H_k - \left(1 + ge^{j\varphi}\right)H^*_{-k} \tag{17}$$

At this time, the following equations (18) and (19) are assumed to be C and D, respectively.

[Math. 18]

$$C = Y''_k + Y''^*_{-k} = H_k - H^*_{-k} \tag{18}$$

[Math. 19]

$$D = Y''_k - Y''^*_{-k} = ge^{-j\varphi}H_k + ge^{j\varphi}H^*_{-k} \tag{19}$$

At this time, the estimation result of the CFR (channel frequency response) of the subcarrier k, the estimation result of the CFR of the subcarrier k, the estimation result of the gain imbalance, and the estimation result of the phase imbalance are shown by the following equations (20) to (23).

[Math. 20]

$$\frac{A + C}{2} = \hat{H}_k \tag{20}$$

[Math. 21]

$$\left(\frac{A - C}{2}\right)^* = \hat{H}_{-k} \tag{21}$$

[Math. 22]

$$\left|\frac{B + D}{2H_k}\right| = \hat{g} \tag{22}$$

-continued

[Math. 23]

$$-\text{angle}\left(\frac{B + D}{2\hat{g}\hat{H}_k}\right) = \hat{\varphi} \tag{23}$$

The compensation result at this time is represented by the following equation (24).

[Math. 24]

$$\left(\text{Compensation } \hat{H}_k S_k\right) = \frac{\left(1 + \hat{g}e^{j\hat{\varphi}}\right)Y_k - \left(1 - \hat{g}e^{j\hat{\varphi}}\right)Y^*_{-k}}{\hat{g}e^{j\hat{\varphi}} + \hat{g}e^{-j\hat{\varphi}}} \tag{24}$$

In this way, the IQ imbalance can be estimated by utilizing two or more training OFDM symbols for mutual leakage of symmetric subcarriers (indexes k and −k). That is, under the frequency selective fading channel, the IQ imbalance can be estimated simultaneously with the channel estimation in the frequency domain in the OFDM transmission (see NPL 2).

Next, a radio communication system according to an embodiment capable of estimating and compensating for the IQ imbalance, even when the single carrier transmission is performed will be described. The radio communication system according to an embodiment performs OFDM modulation training to estimate and compensate for the IQ imbalance in a training stage in order to perform the single carrier transmission from the transmitter to the receiver.

For example, the transmitter that performs the single carrier transmission generates a channel estimation training field by the OFDM modulation, and performs spectrum shaping to approach a spectrum of the single carrier.

Figure 2:
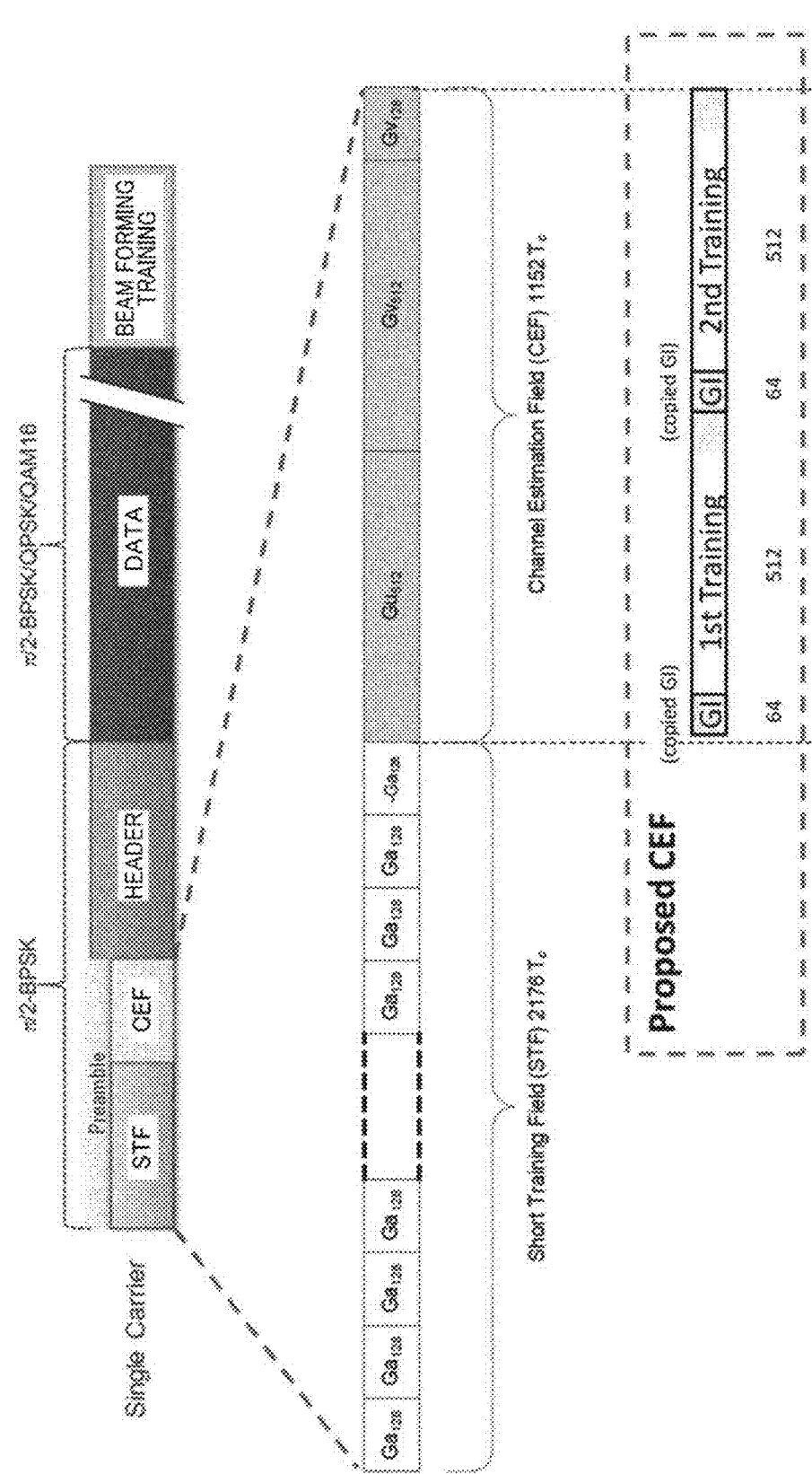
FIG. 2 is a diagram showing a packet transmitted by a transmitter.

FIG. 2 is a diagram showing a packet that is transmitted by the transmitter of the radio communication system equipped with a function compliant with IEEE 802.11ad-SC (see NPL 3) and a function of estimating and compensating for the IQ imbalance in the single carrier transmission.

The transmitter according to an embodiment generates a channel estimation training field in the single carrier transmission by the OFDM modulation, and performs the symmetric subcarrier (index k and −k) training. At this time, the transmitter performs the spectrum shaping (SS) to bring the spectrum of the modulation signal close to the spectrum of the single carrier.

That is, the transmitter according to an embodiment of the present invention changes the channel estimation field (CEF) in the IEEE 802.11ad-SC by the OFDM modulation and the spectrum shaping.

At this time, the CEF includes a first training (1st training) signal and a second training (2nd training) signal each having a guard interval (GI).

Since it is difficult to synchronize the symbol timing in the symmetric subcarrier training, the receiver according to an embodiment synchronizes two training symbols, using another single carrier time domain correlation sequence (short routing field (STF) in FIG. 2).

Figure 3:
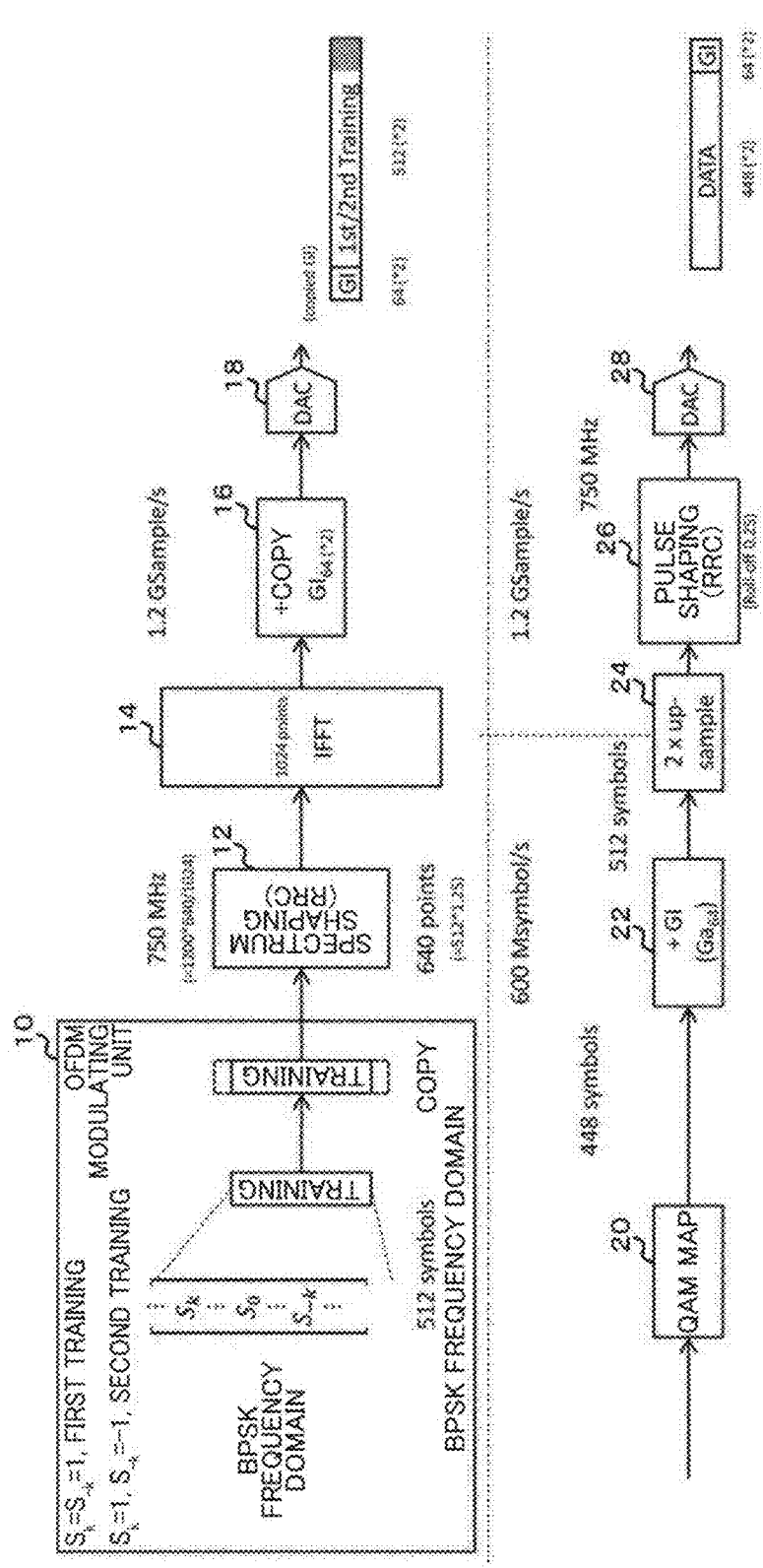
FIG. 3 is a diagram showing functions of the transmitter according to an embodiment.

Next, functions included in the transmitter according to an embodiment will be described. FIG. 3 is a diagram showing functions of the transmitter according to an embodiment.

As shown in FIG. 3, the transmitter according to an embodiment includes functions of an OFDM modulation unit 10, a shaping unit 12, an IFFT unit 14, a copy unit 16, and a DA unit 18 at the time of training, and generates the CEF including the first training signal and the second training signal shown in FIG. 2.

The OFDM modulation unit 10 performs the OFDM modulation of the first training and the second training of the frequency domain. That is, the OFDM modulation unit 10 generates two or more training signals using the symmetric subcarrier at the time of training and performs the OFDM modulation.

The shaping unit 12 performs the spectrum shaping so that each spectrum of the training signal subjected to the OFDM modulation by the OFDM modulation unit 10 is close to the single carrier spectrum.

The IFFT unit 14 performs an inverse Fourier fast transformation. The copy unit 16 copies the training signal and adds GI to each of them. The DA unit 18 is a DAC for performing the DA conversion of the first training signal and the second training signal.

When performing the single carrier transmission, the transmitter includes, for example, functions of a QAM processing unit 20, a GI processing unit 22, a sampling unit 24, a shaping unit 26, and a DA unit 28.

The QAM processing unit 20 performs processing for making a signal for performing the single carrier transmission into a constellation according to a QAM map. The GI processing unit 22 performs processing for removing the GI. The sampling unit 24 performs double up-sampling. The shaping unit 26 shape a pulse of the transmission signal. The DA unit 28 is a DAC for DA-converting the transmission signal, and is shared by, for example, a DAC constituting the DA unit 18.

Figure 4:
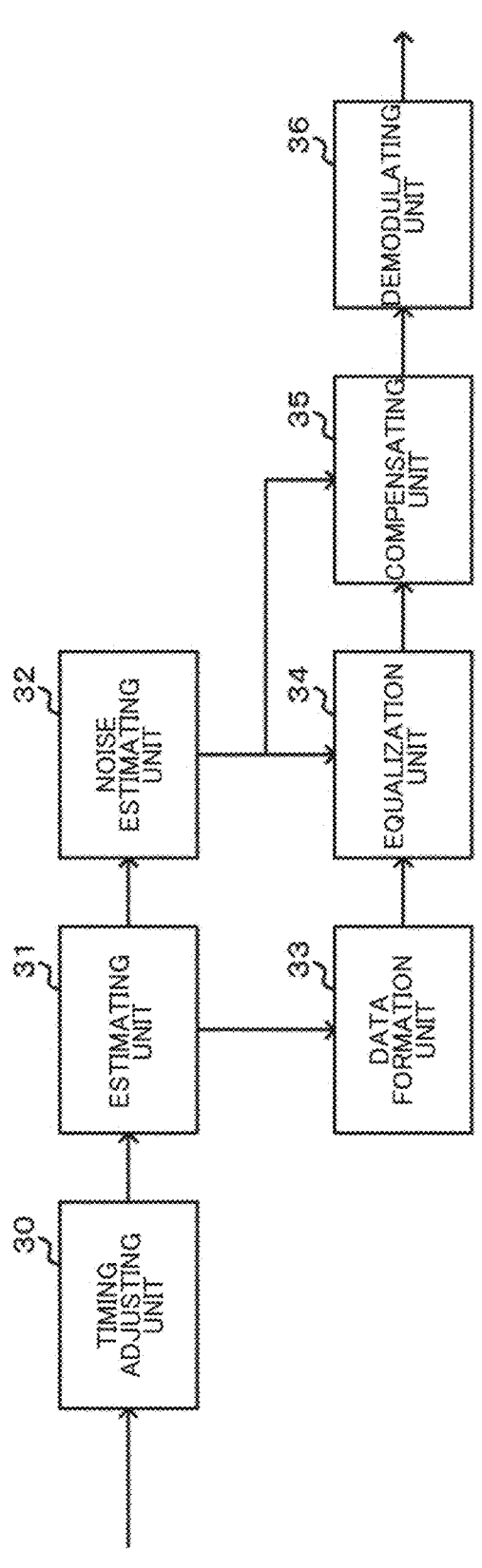
FIG. 4 is a diagram showing functions of the receiver according to an embodiment.

Next, functions included in the receiver according to an embodiment will be explained. FIG. 4 is a diagram showing functions of the receiver according to an embodiment. FIG. 5 is a diagram showing signals referenced when each function of the receiver shown in FIG. 4 processes each packet.

As shown in FIG. 4, the receiver according to an embodiment includes a timing adjusting unit 30, an estimating unit 31, a noise estimating unit 32, a data forming unit 33, an equalization unit 34, a compensation unit 35, and a demodulating unit 36, and estimates and compensates for the IQ imbalance between the first training signal and the second training signal.

The timing adjusting unit 30 adjusts the timing of two or more training signals, by using the single carrier time domain correlation sequence at the time of training. For example, the timing adjusting unit 30 synchronizes symbol timings of two or more training signals by using the STF for a received signal subjected to ½ down-sampling with a matched filter at the time of training, except the CEF at the time of data transmission, and performs the packet detection and the frequency correction (see FIG. 5).

The estimating unit 31 estimates a channel frequency response (CFR) and an IQ imbalance (IQI) from two or more training signals whose timing is adjusted by the timing adjusting unit 30 in a frequency domain, and outputs an estimation result to the noise estimating unit 32 and the data forming unit 33.

The noise estimating unit 32 estimates noise in a time domain, and outputs an estimation result to the equalization unit 34 and the compensation unit 35.

The data forming unit 33 extracts a data field in the time domain, forms the data field into a data block again, converts the data field from the time domain into a frequency domain, and outputs it to the equalization unit 34.

The equalization unit 34 performs a frequency domain equalization (FDE) on the data field, using a result of noise estimation by the noise estimating unit 32 and the data block re-formed by the data forming unit 33 in the frequency domain, and outputs the result to the compensation unit 35.

The compensation unit 35 performs conversion from the frequency domain to the time domain, and compensates for the IQ imbalance estimated by the estimating unit 31. More specifically, the compensation unit 35 compensates for the phase and gain of the IQ imbalance, using the result of noise estimation by the noise estimating unit 32 and the data field subjected to equalization processing by the equalization unit 34 in the time domain.

The demodulating unit 36 demodulates the signal received by the compensation unit 35. More specifically, the demodulating unit 36 performs a bit recovery of the DMG data by de-mapping of the DMG data and decoding of the DMG data.

In this way, in the radio communication system according to an embodiment, since the transmitter generates two or more training signals using the symmetric subcarrier at the time of training, performs the OFDM modulation, and shapes each spectrum of the OFDM-modulated training signals to be close to a single carrier spectrum, the IQ imbalance can be estimated and compensated even when performing the single carrier transmission.

REFERENCE SIGNS LIST

10 OFDM modulation unit
12 Shaping unit
14 IFFT unit
16 Copy unit
18 DA unit
20 QAM processing unit
22 GI processing unit
24 Sampling unit
26 Shaping unit
28 DA unit
30 Timing adjusting unit
31 Estimating unit
32 Noise estimating unit
33 Data formation unit
34 Equalization unit
35 Compensating unit
36 Demodulating unit

The invention claimed is:

1. A radio communication method for transmitting a signal from a transmitter to a receiver using a single carrier,
the transmitter
generating two or more training signals using a symmetric subcarrier at a time of training to perform an Orthogonal Frequency Division Multiplexing (OFDM) modulation, and
shaping a spectrum of each of the OFDM-modulated training signals to be close to a single carrier spectrum, and
the receiver
adjusting timing of the two or more training signals, using a single carrier time domain correlation sequence at the time of training,
estimating a channel response and an in-phase (I) and quadrature (Q) (IQ) imbalance from the two or more training signals whose timing is adjusted,
compensating for the estimated IQ imbalance, and
demodulating the compensated signal.

2. The radio communication method of claim 1, further comprising:

performing an inverse Fourier fast transformation on the two or more training signals.

3. The radio communication method of claim 2, further comprising:

copying the two or more training signals.

4. The radio communication method of claim 2, further comprising:

copying the two or more training signals and adding a guard interval.

5. The radio communication method of claim 4, further comprising:

performing digital to analog conversion of the two or more training signals.

6. A receiver which receives a signal from a transmitter using a single carrier, comprising:

timing adjusting circuitry configured to adjust timing of two or more training signals using a single carrier time domain correlation sequence at the time of training;

estimating circuitry configured to estimate a channel response and an IQ imbalance from the two or more training signals whose timing is adjusted by the timing adjusting circuitry;

compensating circuitry configured to compensate for the IQ imbalance estimated by the estimating circuitry; and demodulating circuitry configured to demodulate a signal compensated by the compensating circuitry.

7. The receiver of claim 6, further comprising:

noise estimating circuitry configured to estimate noise in a time domain.

8. The receiver of claim 6, further comprising:

equalization circuitry configured to perform frequency domain equalization.

9. The receiver of claim 7, further comprising:

equalization circuitry configured to perform frequency domain equalization using an output from the noise estimating circuitry.

10. The receiver of claim 6, wherein the demodulating circuitry performs a bit recovery.

\* \* \* \* \*